United States Patent Office 3,491,592
Patented Jan. 27, 1970

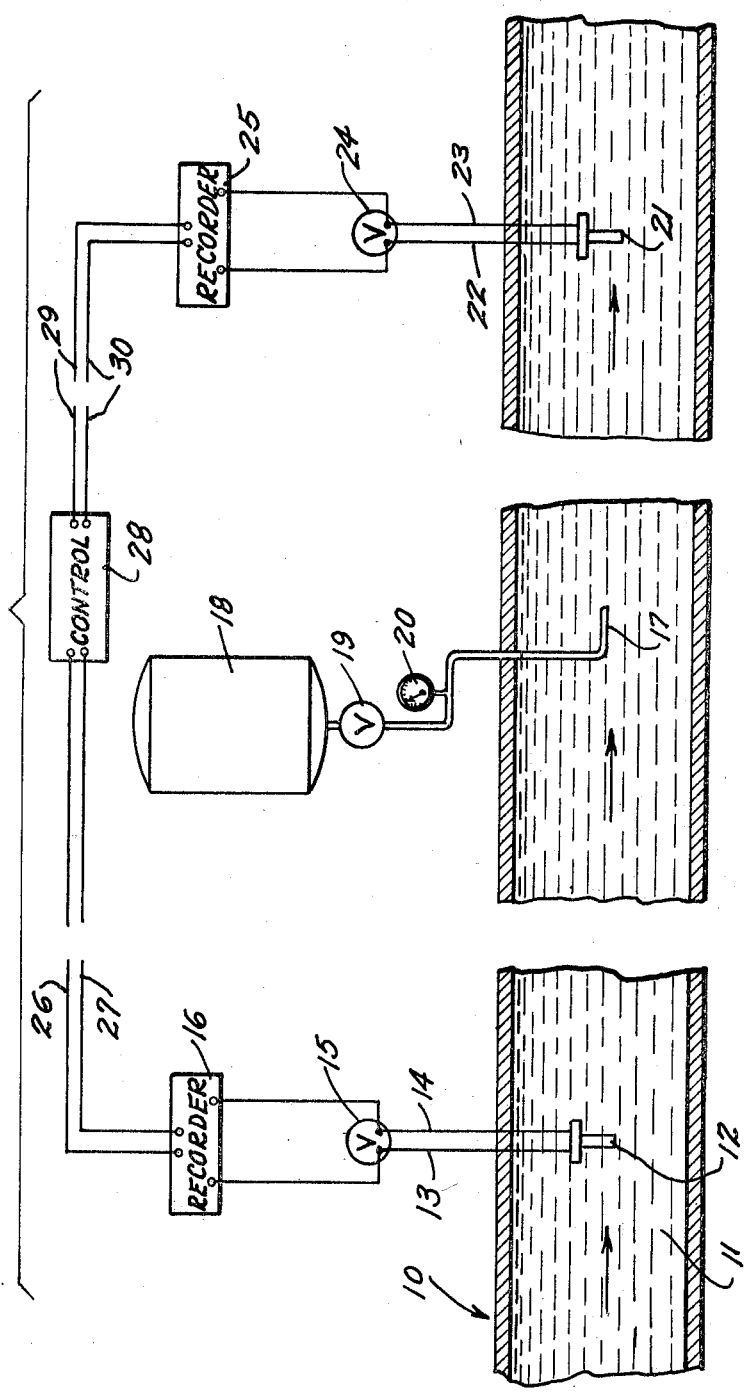

3,491,592
MEASUREMENT OF FLOW RATE OF AQUEOUS STREAMS
Robert W. Evers, Chicago, Frank N. Kemmer, La Grange, and William R. Watson, Oak Lawn, Ill., assignors to Nalco Chemical Company, Chicago, Ill., a corporation of Delaware
Filed Oct. 23, 1967, Ser. No. 677,474
Int. Cl. G01f 1/00
U.S. Cl. 73—194        5 Claims

ABSTRACT OF THE DISCLOSURE

Method and apparatus for measuring the volumetric flow rate of a contained aqueous stream wherein two electrodes are positioned in spaced relation in the stream with a source of ions being located between the two electrodes to introduce a predetermined flow of an ionic solution of known strength of ions into the stream, the first electrode sensing the ion concentration of the stream to provide a reference value, and the second electrode sensing the ion concentration beyond the point of injection of additional ions, the difference being inversely related to the flow rate of the stream between the electrodes.

BACKGROUND OF THE INVENTION

Field of the invention

This invention is in the field of measuring flow rates of aqueous streams as, for example, in a conduit system. It utilizes electrical sensing means disposed in the stream, the sensing means being sensitive to the concentration of an ionizable compound contained in the stream. One electrode senses the background value of ionic content in the flowing stream, while the other senses the ionic content of the stream downstream from an injection point where a controlled predetermined amount of additional ions is introduced into the stream. The difference between the two readings obtained is then a measure of the flow rate of the stream. This information can be displayed visually or through suitable auxiliary apparatus, and can be used to provide a feedback signal which then adjusts the flow rate of the stream as required by the information derived from the electrodes to maintain the flow rate at a predetermined value.

DESCRIPTION OF THE PRIOR ART

The present invention makes use of commercially available equipment from other environments and applies them in the field of measuring volumetric flow rates of an aqueous stream. The two sensing elements employed are responsive to changes in ionic content of the streams and may take the form of conductivity measuring devices or ion selective electrodes.

Conductivity measuring devices are very well known in the prior art, and can take many forms. One of the simplest comprises a Wheatstone bridge circuit wherein the stream constitutes the unknown resistance. Other impedance measuring devices can also be employed.

The more precise embodiment of the invention involves the use of ion selective electrodes which are relatively new in the field of analytical potentiometry. A description of the theory of operation of these electrodes and the commercial forms of such electrodes will be found in the article entitled "Ion-Selective Electrodes" appearing in the Chemical & Engineering News of June 12, 1967, pages 146 to 158.

SUMMARY OF THE INVENTION

The present invention relates to an accurate means for determining the flow rate of a confined aqueous stream.

Various types of mechanical flow meters have, of course, been used in the prior art, but in many situations, such as the measurement of waste water flow in cramped quarters, prior art flow-measuring devices cannot be readily inserted in the stream flow. The system of the present invention makes it possible to measure flow rate reliably in any situation, including the measurement of waste water flows.

In a typical embodiment of the present invention, an ion selective electrode sensitive, let us say, to chloride ions is positioned at a fixed point in the stream. Downstream from this first point, a carefully metered solution of sodium chloride of known concentration is injected into the flowing stream. Downstream from the injection site, a second ion sensitive electrode is positioned to determine the chloride ion concentration resulting from the addition of the predetermined amount of chloride ions into the flowing stream. This change in concentration of chloride ions, reflected by the differences in the readings at the two electrodes, then provides an accurate measurement of the flow rate as represented by the equation:

$$\frac{(\#\text{Salt } H2^{-1})(2000)}{\Delta \text{ p.p.m. Salt}} = 6 \text{ PM}$$

Ion selective electrodes are designed to operate in accordance with the Nernst equation which sets forth the potential of an electrode in equilibrium with a solution of its ions of given concentration. The equation is usually expressed as follows:

$$E = E° + \frac{RT}{nF} \ln (M)$$

where:

E is the equilibrium potential of the electrode (versus a normal hydrogen electrode)
E° is the standard oxidation potential
n is the number of electrons needed for the reduction of the ion
F is the Faraday (96,500 coulombs)
R is the gas constant
T is the absolute temperature
(M) to a first approximation is the molar concentration of ions in equilibrium with the electrode Commercially available ion sensitive devices may take the form of a dry glass membrane characterized by a dry glass layer surrounded on either side by hydrated gel layers. Typically, the dry glass layer may be about 50 microns in thickness, and the hydrated layers may vary in depth from 50 to 1000 angstrom units or so. When the dry glass electrode is first immersed in an aqueous medium, the formation of the hydrated layers causes swelling of the membrane. Thereafter, a constant dissolution of the hydrated layer takes place, accompanied by further hydration of additional dry glass so as to maintain the thickness of the hydrated layer at some fairly constant, steady state value. The rate of dissolution of the hydrated layer depends on the composition of the glass and also on the nature of the solution.

In operation, the hydrated glass surfaces undergo cation exchange, whereby the cations, such as sodium ions, from solution react with the hydrogen ions in the glass to cause sodium ions to be assimilated in the glass, with the release of hydrogen ions to solution.

The glass electrodes employed in such ion sensitive materials are usually mixtures of sodium oxide, aluminum oxide, and silica. A particularly effective glass composition for sodium selectivity contains 11% sodium oxide, 18% alumina, and 71% silica.

As far as chloride selective electrodes are concerned, one of the best known involves the use of a silicone rubber matrix. These membranes are prepared by mixing a silicone rubber monomer with a finely divided, relatively insoluble material such as silver chloride. Then the silicone rubber monomer is polymerized in the cold whereby the fine particles of the precipitate are immobilized in the rubber matrix. Usually, the precipitate constitutes about 50% by weight of the impregnated matrix.

While the use of sodium sensitive or chloride sensitive devices forms the preferred embodiments of the invention, it should be understood that other types of metal salts could also be employed. The ion sensitive electrodes are used to measure ion activities, and not ion concentrations directly. These measurements can be converted to concentrations if the temperature and the activity coefficients are known.

BRIEF DESCRIPTION OF THE DRAWING

The single figure on the drawings is a somewhat schematic view of a conduit system in which the improved device of the present invention is incorporated.

DESCRIPTION OF THE PREFERRED EMBODIMENT

Referring to the drawings, reference numeral 10 indicates generally a conduit through which an aqueous medium 11 is flowing, the liquid flow being in the direction of the arrows. An ion sensitive electrode 12 is disposed in the conduit in the path of the fluid flow, the electrode 12 being sensitive to chloride ions and functioning to provide a background reading of chloride ion concentration in the stream for reference purposes. A pair of conductors 13 and 14 apply the voltage developed across the electrode 12 to a voltmeter 15 and also to a recorder 16 where a permanent indication of variations in electrode voltage can be recorded. Downstream from the electrode 12 there is provided an injector system for introducing controlled amounts of chloride ions into the stream as it moves through the conduit. For this purpose, there is provided an injector nozzle 17 which is fed from a tank 18 containing a sodium chloride solution of predetermined concentration, A flow control valve 19 is provided for metering purposes, and a flow meter 20 is incorporated into the feed line for monitoring the amount of sodium chloride solution being delivered.

Further downstream there is a second electrode assembly for detecting the amount of increase in the chloride ion concentration of the stream due to the injection of the chloride ions at the nozzle 17. It will be apparent that at relatively low flow rates, the change in concentration of chloride ions can be relatively large, while at high liquid flow rates the change in chloride ion concentration, due to the injection of the additional chloride ions, will be relatively smaller. This second electrode assembly includes an ion selective electrode 21 which delivers a voltage through a pair of conductors 22 and 23 to a voltmeter 24 and a recorder 25. Comparing the readings on the recorder 25 with the readings on the recorder 16 then enables the operator to determine the volumetric flow rate of the stream past the injector 17, since the flow rate is directly proportional to the amount of ions introduced at the injector site, for a unit of time, and inversely proportional to the change in ion concentration. The electrode potentials may also be subtracted by a suitable electrical circuit, so that the difference may be measured by a single recorder, rather than by two such devices.

The voltages developed at the electrodes can also be used to perform a control function. For example, the information from the recorder 16 can be fed by means of a pair of conductors 26 and 27 to a control station generally indicated at reference numeral 28, where it is compared with the information received from the recorder 25 and delivered to the control station 28 by means of conductors 29 and 30. The control station may be a suitable servomechanism which compares the two voltages and supplies an error signal to suitable amplifying mechanisms (not shown) when the difference between the voltages is other than a predetermined value. This error signal, in turn, can be used to then adjust the flow rate of the aqueous stream in the conduit in response to these voltage variations.

We claim as our invention:

1. An apparatus for measuring the rate of flow of a confined aqueous stream which comprises an electrical sensing means for measuring a property of the stream dependent upon the ionization of an ionizable compound therein at a first point in said stream, means for injecting a predetermined quantity of said ionizable compound into said stream at a second point downstream from said first point, and an electrical sensing means for measuring said property of said stream downstream of said second point, and means for comparing the outputs of the two electrical sensing means.

2. The apparatus of claim 1 in which said sensing means each includes an ion selective electrode.

3. The apparatus of claim 2 in which said ion selective electrode is sensitive to chloride ions.

4. The apparatus of claim 1 in which said sensing means each includes a conductivity measuring electrode.

5. The apparatus of claim 1 in which said injecting means injects a solution of sodium chloride into said stream.

References Cited

UNITED STATES PATENTS

| | | | |
|---|---|---|---|
| 1,145,509 | 7/1915 | Pike et al. | 137—5 |
| 1,200,653 | 10/1916 | Sawyer | 73—194 |
| 1,388,613 | 8/1921 | Simsohn | 137—5 |
| 2,559,090 | 7/1951 | Potter | 137—93 |
| 2,611,268 | 9/1952 | Mellen | 73—194 |
| 3,196,679 | 7/1965 | Howland | 73—204 |
| 3,324,720 | 6/1967 | Sutherland | 73—194 |
| 3,394,080 | 7/1968 | Hoffmann et al. | 137—93 XR |

FOREIGN PATENTS

| | | |
|---|---|---|
| 566,541 | 1/1945 | Great Britain. |
| 936,037 | 9/1963 | Great Britain. |

CHARLES A. RUEHL, Primary Examiner